Figure 1:
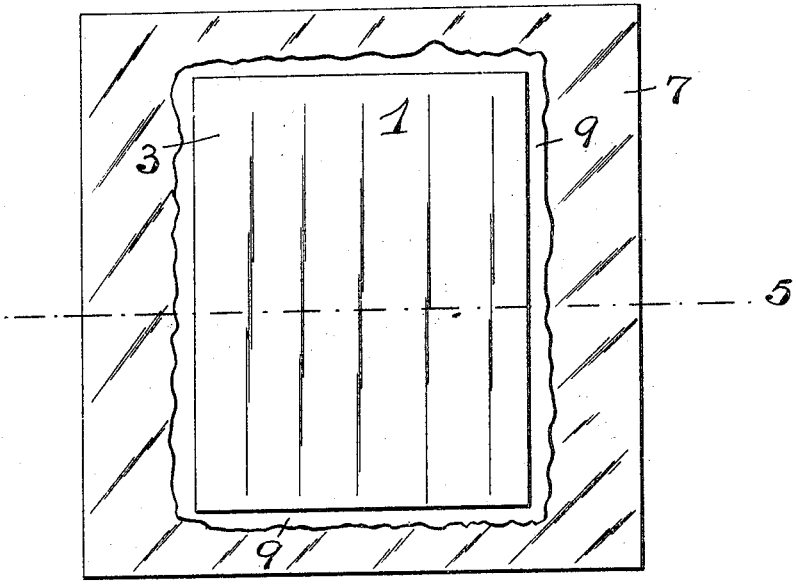

No. 802,022. PATENTED OCT. 17, 1905.
L. SCHILL.
COLORED PHOTOGRAPH.
APPLICATION FILED JAN. 20, 1905.

3 SHEETS—SHEET 1.

WITNESSES:
Geo. D. Richards
Harry G. Hattin

INVENTOR:
Ludwig Schill,
BY
Fred'k. Fraentzel,
ATTORNEY

No. 802,022. PATENTED OCT. 17, 1905.
L. SCHILL.
COLORED PHOTOGRAPH.
APPLICATION FILED JAN. 20, 1905.

3 SHEETS—SHEET 2.

WITNESSES:
Geo. D. Richards
Harry G. Walters

INVENTOR,
Ludwig Schill,
BY Fred C. Fraentzel
ATTORNEY

No. 802,022. PATENTED OCT. 17, 1905.
L. SCHILL.
COLORED PHOTOGRAPH.
APPLICATION FILED JAN. 20, 1905.
3 SHEETS—SHEET 3.
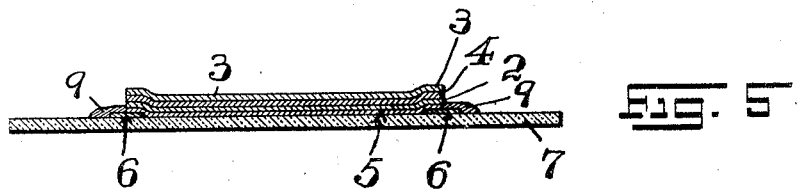
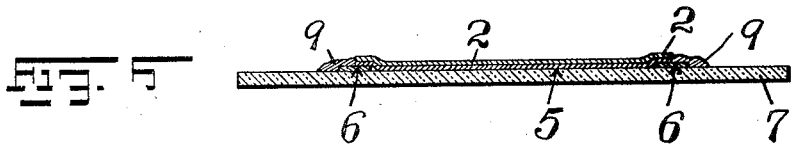
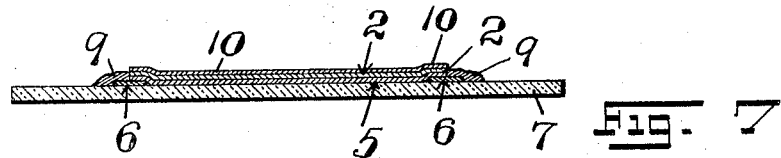
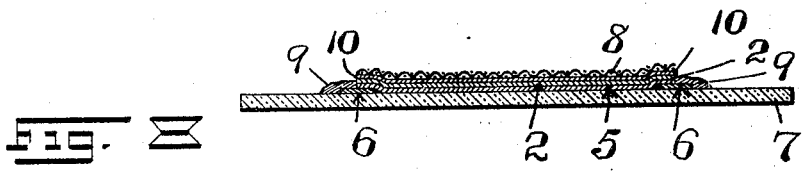
WITNESSES:
Geo. D. Richards
Harry G. Halter
INVENTOR:
Ludwig Schill,
BY
Fred'k C. Fraentzel
ATTORNEY

UNITED STATES PATENT OFFICE.

LUDWIG SCHILL, OF NEWARK, NEW JERSEY.

COLORED PHOTOGRAPH.

No. 802,022.  Specification of Letters Patent.  Patented Oct. 17, 1905.

Application filed January 20, 1905. Serial No. 241,925.

*To all whom it may concern:*

Be it known that I, LUDWIG SCHILL, a citizen of the United States, residing at Newark, in the county of Essex and State of New Jersey, have invented certain new and useful Improvements in Colored Photographs; and I do hereby declare the following to be a full, clear, and exact description of the invention, such as will enable others skilled in the art to which it appertains to make and use the same, reference being had to the accompanying drawings, and to numerals of reference marked thereon, which form a part of this specification.

This invention relates to improvements in the art pertaining to photography; and the invention has reference more particularly to a novel method of applying colors to photographs by painting upon the back of the picture-carrying film with colors preferably in oil, while retaining all the details of the photograph and giving it all the colors and the appearance of a hand-painting in oil colors.

My present invention has for its principal object the production of a photograph in imitation of oil-painting, as hereinafter more fully set forth; and the invention has for its further object a novel, simple, cheap, and efficient method for the production of such photographs in imitation of oil-painting.

Other objects of this invention not at this time more particularly specified will be clearly evident from the following detailed description of my present invention.

The invention consists, primarily, in the novel method or process of producing photographs in colors, and preferably in imitation of oil-painting, substantially as hereinafter set forth and then finally embodied in the clauses of the claim, which are appended to and which form an essential part of this specification.

The usual and ordinary photograph consists of a top film or face of gelatin, collodion, or albumen, and in this film are embedded the various metals which constitute the photograph or picture produced in the usual manner well known in the art of photography. Between this picture carrying or bearing film and a paper support is generally a thin coating of baryta; and it is the main object of my invention to destroy this coating of baryta, whereby I am enabled to remove the paper support from the back of the said picture-carrying film, then color or paint the back of this picture-carrying film at the place or places where the picture is exposed to view when dry, or in such other places upon the back of the film as may be desired, and then finally applying to said painted back of the film a suitable support of paper or preferably of linen, muslin, or other suitable fabric, whereby an absolutely permanent and beautiful picture is the result and one which resembles in every detail an oil-painting on linen or the like.

The photograph in imitation of oil-painting and the novel method or process of producing the same are clearly illustrated in the accompanying drawings, in which—

Figure 2:
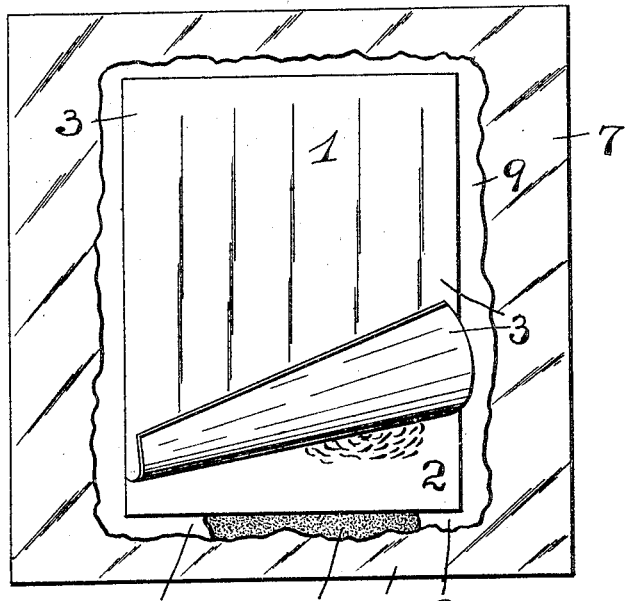
Figure 3:
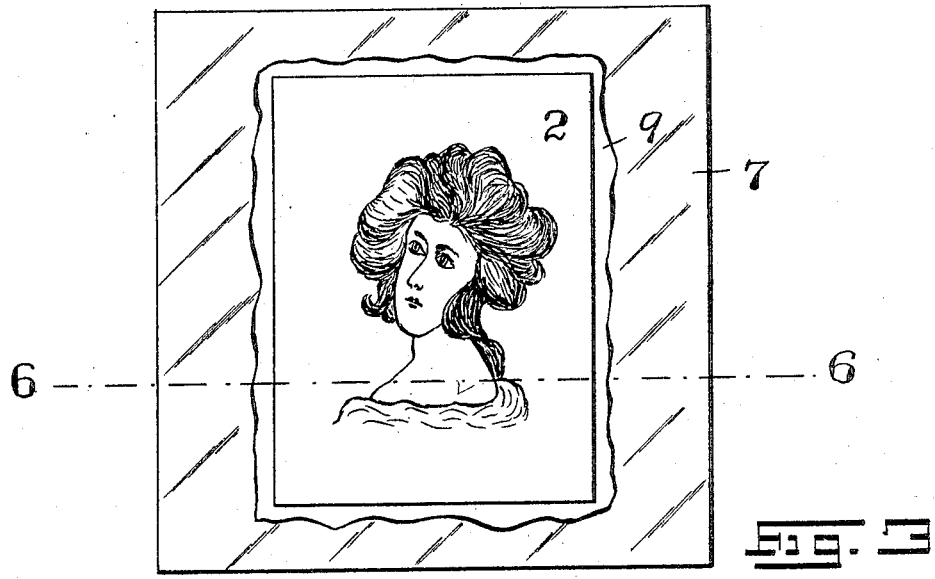
Figure 4:
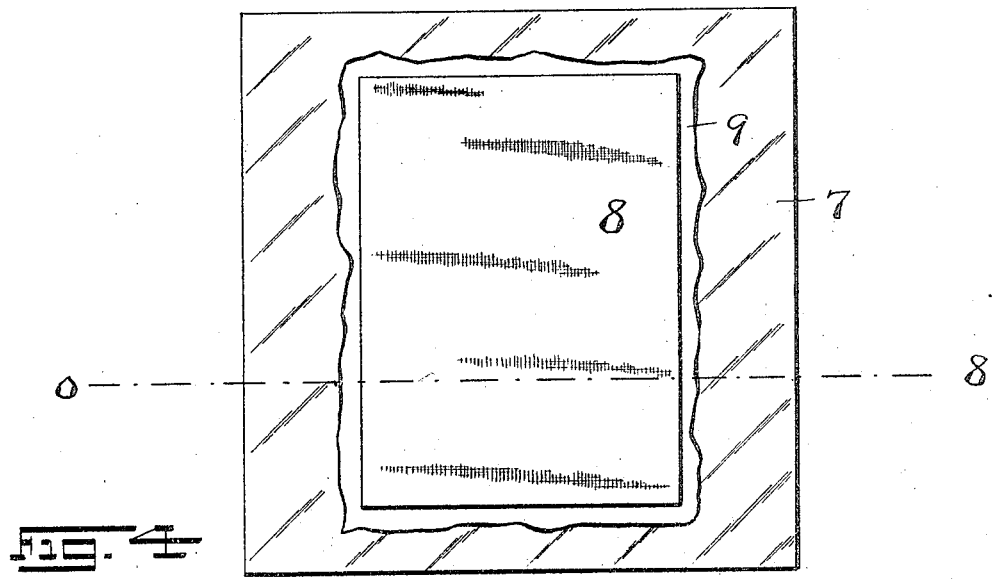

Figure 1 is a back view of a photograph applied to a glass or other suitable transparent supporting-plate with the picture carrying or bearing film arranged directly against the face of said supporting-plate. Fig. 2 is a view similar to that represented in said Fig. 1, showing the manner of stripping the back paper or support from the picture-carrying film, a portion of the paraffin coating being omitted to show the cement beneath the same projecting from the marginal edge of the picture-bearing film. Fig. 3 is a similar view of the parts with the back paper or support entirely removed, exposing the back of the picture-carrying film ready for the application of the coloring-matter or paint thereto and Fig. 4 is a back view of the painted picture-carrying film, having secured thereon a supporting-back of linen or other suitable fabric. Fig. 5 is a transverse section of the parts represented in said Fig. 1, said section being taken on line 5 5 in said Fig. 1. Fig. 6 is a transverse section taken on line 6 6 in said Fig. 3 with the back paper or film-support removed, and Fig. 7 is a similar section of the same parts provided with a coating of coloring-matter or paint. Fig. 8 is a transverse section taken on line 8 8 in Fig. 4, and Fig. 9 is a face view of the finished color-photograph removed from the glass or other transparent plate.

Similar characters of reference are employed in the above-described views to indicate corresponding parts.

Referring now to the said drawings, the reference character 1 indicates a photograph made in the usual manner known in the art of photography and comprising the usual picture carrying or bearing film 2, of collodion, gelatin, albumen, or the like, and a back support 3, of paper, attached upon the back of the film 2 by means of a coating 4 of baryta.

In carrying out my novel method or process of providing the photograph produced in the body of the film 2 upon its back with an application of a coloring-matter or oil paint or paints, the extremely thin collodoin, gelatin, or albumen film has applied upon its face a comparatively thick coating 5 of varnish, collodion, or banana-oil in order to strengthen the said film 2, for the purposes to be presently set forth. This having been accomplished, the photograph unmounted is secured at its edges or other suitable points by means of glue 6 or other suitable sticking matter upon the flat face of a glass or other transparent plate 7, substantially as shown in Figs. 1 and 2 of the drawings. To protect the glued edges of the photograph, the same is provided with a thin coating of hot paraffin 9 or other acid-resisting material. The secured picture 1 and the glass or other transparent plate 7 are then immersed in a bath of sulfuric acid, whereby the holding qualities of the baryta 4 are destroyed and the back support 3 can be readily stripped from the back of the film 2 in the manner clearly shown in said Fig. 2 of the drawings, thus leaving simply the picture carrying or bearing film 2 secured upon the said plate 7, as clearly illustrated in Figs. 3 and 6 of the drawings, the film 2 being still secured by means of the glue or the like at its edges to the said plate 7. The purpose of protecting the glued edges of the photograph by means of an acid-resisting material, such as paraffin, before removing the paper support from the film is to exclude all acid and water from entering the space formed between the glass plate and the temporarily-attached film, and thereby keeping the extremely thin film smooth and tight for painting and remounting, as will hereinafter more fully appear. This is an essential and most important feature of my present invention, for it admits of the glass plate and the attached photograph being immersed in a strong acid solution, which destroys the baryta and makes it possible to readily remove or strip off all the paper backing. At the same time it keeps the space between the glass plate and attached film perfectly dry and the film free from wrinkles, and this in turn is essential, because it permits of the examination of the picture while painting, the face of the picture thereby not being obscured by any water or acid thereon. The back or rear of this film is then provided or painted with the various colors desired, oil or wax colors being preferred, substantially as represented by the coating 10 and as indicated in Fig. 7 of the drawings, the said glass or other transparent plate 7 serving as a suitable support for the thin film and also enabling the operator to look upon the opposite side of said plate 7 and see the effects of the colors upon the picture during the application of the colors by means of a brush upon the back of the film 2. After the coloring-matter or paint has dried another backing 8, of paper or preferably linen, muslin, or other similar fabric, is then glued or cemented directly upon the back and painted surface of the film 2. The said film 2 and backing 8 are then removed from the said transparent supporting-plate 7, and a permanent and beautiful picture 11, which resembles in every detail an oil-painting on linen or other suitable fabric, is the result, as will be clearly understood from an inspection of Fig. 9 of the drawings.

From the foregoing description it will be seen that I have produced a simply and cheaply made photograph in exact imitation of a hand-painted oil-painting and one in which all the details of the picture are clearly brought out.

Having thus described my invention, what I claim is—

1. The method herein described of producing colored photographs, which consists in temporarily securing an unmounted photograph at its edges with its picture-bearing film upon a transparent plate, then rendering said secured edges acid-proof, to exclude all water and acid from the space between said transparent plate and said film, and to keep said space between said plate and film dry for examination of the face of the picture, and the film free from wrinkles, then immersing the same in acid, removing the paper support from the film so as to expose the back of the film, and applying coloring-matter to the back of the said film, substantially as set forth.

2. The method herein described of producing colored photographs, which consists in temporarily securing an unmounted photograph at its edges with its picture-bearing film upon a transparent plate, then rendering said secured edges acid-proof, to exclude all water and acid from the space between said transparent plate and said film, and to keep said space between said plate and film dry for examination of the face of the picture, and the film free from wrinkles, then immersing the same in acid, removing the paper support from the film so as to expose the back of the film, applying coloring-matter to the back of the said film, and gluing or cementing another support upon the back and colored surface of the said film, substantially as set forth.

3. The method herein described of producing colored photographs, which consists in temporarily securing an unmounted photograph at its edges with its picture-bearing film upon a transparent plate, then rendering said secured edges acid-proof, to exclude all water and acid from the space between said transparent plate and said film, and to keep said space between said plate and film dry for examination of the face of the picture, and the film free from wrinkles, then immersing the same in acid, removing the paper support from the film so as to expose the back of the film, applying coloring-matter to the back of the said film, and gluing or cementing a linen-fabric backing upon the back and colored surface of the said film, substantially as set forth.

4. The method herein described of producing colored photographs, which consists in temporarily securing an unmounted photograph at its edges with its picture-bearing film upon a transparent plate, then rendering said secured edges acid-proof, to exclude all water and acid from the space between said transparent plate and said film, and to keep said space between said plate and film dry for examination of the face of the picture, and the film free from wrinkles, then immersing the same in acid, removing the paper support from the film, so as to expose the back of the film, and applying colors in oil to the exposed back of said film, substantially as set forth.

5. The method herein described of producing colored photographs, which consists in temporarily securing an unmounted photograph at its edges with its picture-bearing film upon a transparent plate, then rendering said secured edges acid-proof, to exclude all water and acid from the space between said transparent plate and said film, and to keep said space between said plate and film dry for examination of the face of the picture, and the film free from wrinkles, then immersing the same in acid, removing the paper support from the film, so as to expose the back of the film, applying colors in oil to the exposed back of the film, and gluing or cementing another support upon the back and colored surface of the film, substantially as set forth.

6. The method herein described of producing colored photographs, which consists in temporarily securing an unmounted photograph at its edges with its picture-bearing film upon a transparent plate, then rendering said secured edges acid-proof, to exclude all water and acid from the space between said transparent plate and said film, and to keep said space between said plate and film dry for examination of the face of the picture, and the film free from wrinkles, then immersing the same in acid, removing the paper support from the film, so as to expose the back of the film, applying colors in oil to the exposed back of the film, and gluing or cementing a linen-fabric backing upon the back and colored surface of said film, substantially as set forth.

In testimony that I claim the invention set forth above I have hereunto set my hand this 19th day of January, 1905.

LUDWIG SCHILL.

Witnesses:
 FREDK. C. FRAENTZEL,
 GEO. D. RICHARDS.